(12) United States Patent
Shibutani

(10) Patent No.: US 6,613,853 B1
(45) Date of Patent: Sep. 2, 2003

(54) PRODUCTION METHOD OF VINYL RESIN

(75) Inventor: Mitsuo Shibutani, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 58 days.

(21) Appl. No.: 09/696,495

(22) Filed: Oct. 25, 2000

(30) Foreign Application Priority Data

Oct. 28, 1999 (JP) .......................................... 11-307000

(51) Int. Cl.$^7$ ................................................. C08F 2/20
(52) U.S. Cl. ...................... 526/202; 524/459; 524/503; 526/319; 526/344.2
(58) Field of Search ............................. 526/202, 344.2, 526/319; 524/459, 503

(56) References Cited

U.S. PATENT DOCUMENTS

| | | | |
|---|---|---|---|
| 4,226,966 A | * 10/1980 | Shiraishi et al. | ............ 526/202 |
| 5,087,678 A | 2/1992 | Noguki et al. | |
| 5,169,918 A | * 12/1992 | Tomishima et al. | ...... 526/344.2 |
| 5,278,262 A | * 1/1994 | Tomishima et al. | ........... 526/80 |
| 5,448,004 A | * 9/1995 | Amano et al. | .............. 526/202 |
| 5,478,900 A | 12/1995 | Amano et al. | |
| 5,502,123 A | 3/1996 | Hiyama et al. | |
| 5,756,602 A | * 5/1998 | Hui et al. | ...................... 526/61 |
| 5,849,831 A | 12/1998 | Takada | |
| 6,150,484 A | * 11/2000 | Kobayashi et al. | ......... 526/200 |

FOREIGN PATENT DOCUMENTS

| | | |
|---|---|---|
| JP | 55 137105 | 10/1980 |
| JP | 03 212409 | 9/1991 |
| JP | 07 053607 | 2/1995 |
| JP | 11 116630 | 4/1999 |

* cited by examiner

*Primary Examiner*—Judy M. Reddick
(74) *Attorney, Agent, or Firm*—Leydig, Voit & Mayer, Ltd.

(57) ABSTRACT

A production method of a vinyl resin, which comprises subjecting a vinyl compound to suspension polymerization in a polymerization tank equipped with a reflux condenser in the presence of a dispersion stabilizer, wherein a polyvinyl alcohol resin (A) having a degree of hydrolysis of not less than 65 mol %, a polymerization degree of not less than 700 and satisfying the following formula (1)

$$0.0300 \leq (3-Y)/X < 0.0330 \qquad (1)$$

wherein X is a degree of hydrolysis (mol %) and Y is a degree of iodine absorption, is added at a polymerization conversion rate of the vinyl compound of not less than 30%. The production method of a vinyl resin of the present invention affords a vinyl resin having a high bulk density, which shows a superior antifoaming effect to suppress dry foams generated during the middle and the latter periods of polymerization.

9 Claims, No Drawings

PRODUCTION METHOD OF VINYL RESIN

TECHNICAL FIELD OF THE INVENTION

The present invention relates to a method for producing a vinyl resin having superior productivity, which comprises subjecting a vinyl compound to suspension polymerization by the use of a polymerization tank equipped with a reflux condenser. More particularly, the present invention relates to a method for producing a vinyl resin having a high bulk density, which is superior in antifoaming effect against dry foams generated during the middle period and the latter period of polymerization in a polymerization tank.

BACKGROUND OF THE INVENTION

A typical method for industrial production of a vinyl chloride resin comprises batch type suspension polymerization including dispersing a vinyl chloride monomer in an aqueous medium in the presence of a dispersion stabilizer in a polymerization tank, feeding an oil-soluble polymerization initiator into the tank, and raising the temperature to allow for polymerization.

For an improved productivity, the time spent on one batch of polymerization has been required to be shortened in recent years. To meet the request, a polymerization tank equipped with a reflux condenser may be used to promote removal of polymerization reaction heat, or a previously heated aqueous medium may be used to shorten the temperature elevating time (hot charge method).

When a polymerization tank equipped with a reflux condenser is used, however, wet foams and dry foams occur because of the pressure near the reflux condenser, which decreases as the gas of vinyl chloride monomer is condensed. The wet foams contain, as a main component, water from polyvinyl alcohol. The dry foams contain, as a main component, vinyl chloride resin (particles) and vinyl chloride monomer, and are generated during the middle period and the latter period of polymerization. When the wet foams and dry foams are generated, the effective area in the polymerization tank becomes smaller, which in turn lowers the productivity. When dry foams are generated, moreover, scales adhere to the reflux condenser, thereby making the temperature of the polymerization tank uncontrollable. When the ref lux condenser is not used, dry foams do not occur, but the polymerization time is prolonged and the productivity becomes low.

To deal with these defects, U.S. Pat. No. 5,087,678 discloses a method wherein silicone, such as dimethylpolysiloxane, polyvinyl alcohol having a low degree of hydrolysis, and the like are added when the polymerization reaction heat in a reflux condenser is removed by not more than 10% of the total polymerization reaction heat; (1). JP-A-3-212409 discloses a method wherein a water-insoluble, partially hydrolyzed polyvinyl alcohol (0.002–0.007 part by weight per 100 parts by weight of a vinyl chloride monomer) having a degree of hydrolysis of 20–50 mol % and a polymerization degree of 200–400 and an antifoaming agent (0.001–0.01 part by weight per 100 parts by weight of the vinyl chloride monomer), such as dimethylpolysiloxane, are added when the polymerization reaction heat in a reflux condenser is removed by less than 10% of the total polymerization reaction heat; (2).

JP-A-55-137105 discloses addition of ionized polyvinyl alcohol having a degree of hydrolysis of 60–80 mol %, before the start of polymerization; (3). U.S. Pat. No. 5,502,123 discloses a method wherein water-soluble polyvinyl alcohol having a degree of hydrolysis of 70–85 mol % and a polymerization degree of 700–3,000 is added at a point where the polymerization conversion is 5–50%, and polymerization is performed at a temperature of 58–70° C.; (4). JP-A-7-53607 discloses a method wherein water-soluble polyvinyl alcohol having a degree of hydrolysis of 70–85 mol % and a polymerization degree of 700–3,000 is added continuously or discontinuously at a point where the polymerization conversion is 5–50%; (5). U.S. Pat. No. 5,478,900 discloses a method wherein a water-soluble polyvinyl alcohol having a degree of hydrolysis of 75–85 mol % and a polymerization degree of 1500–2,700 is added at a point where the polymerization conversion is 30–60%; (6).

In addition, U.S. Pat. No. 5,849,831 discloses a method wherein a polyvinyl alcohol having a degree of hydrolysis of not more than 85 mol % is added at a point where the polymerization conversion is 30–90%; (7), and JP-A-11-116630 discloses a method wherein polyvinyl alcohol having a degree of hydrolysis of not more than 85 mol % is added continuously or in two or more portions at a point where the polymerization conversion is 30–90%; (8).

However, the above-mentioned methods (1) and (2) suffer from extensive occurrence of dry foams that frequently decrease the bulk density of vinyl chloride resin. The methods (3) to (6) are associated with the problems in that polymerization requires an extended period of time and the productivity becomes poor, due to the non-use of a reflux condenser.

Moreover, while the methods (7) and (8) show high productivity due to the use of a polymerization tank equipped with a reflux condenser, the antifoaming effect to suppress dry foams is not entirely satisfactory and the problem of scale attachment still remains, leaving room for further improvement required by the recent high development of technology.

SUMMARY OF THE INVENTION

According to the present invention, there is proposed a production method of a vinyl resin having a high bulk density and a superior antifoaming effect to suppress occurrence of dry foams, which comprises suspension polymerization of a vinyl compound by the use of a polymerization tank equipped with a reflux condenser.

It has been further found that, when the above-mentioned suspension polymerization is conducted with the addition of polyvinyl alcohol (A) having a degree of hydrolysis of not less than 65 mol %, a polymerization degree of not less than 700 and satisfying the following formula (1), at a point where the polymerization conversion of the vinyl compound is not less than 30%, the occurrence of dry foams during the production can be suppressed and a vinyl resin having a high bulk density can be obtained:

$$0.0300 \leq (3-Y)/X \leq 0.0330 \tag{1}$$

wherein X is a degree of hydrolysis (mol %) and Y is a degree of iodine absorption.

As used herein, by the degree of iodine absorption is meant the absorbance measured at wavelength 490 nm and slit width 1 mm, for a mixture of a 0.1 wt % sample solution (5 ml), pure water (11 ml) and 1/1000[N] iodine solution (4 ml), which has been adjusted to 25° C. and stood for 20 min.

DETAILED DESCRIPTION OF THE INVENTION

The reflux condenser to be used in the present invention is used for efficiently removing a polymerization reaction heat during suspension polymerization of a vinyl compound. That is, an unreacted gaseous vinyl compound generated from a suspension in a polymerization tank is liquidized in a reflux condenser. The vinyl compound liquidized in the reflux condenser takes away the polymerization heat while being sent back to the polymerization tank. The temperature of the cooling water in the reflux condenser is generally about 10–50° C. The temperature of the polymerization tank is controlled by the reflux condenser and also by a jacket or coil of the polymerization tank. The proportion of the heat from the polymerization reaction, which is to be removed by the reflux condenser, is not particularly limited, but it is preferably 10–80%, more preferably 20–60%, of the total polymerization reaction heat.

In the present invention, a vinyl compound is subjected to suspension polymerization in the presence of a dispersion stabilizer for suspension polymerization. Specifically, a vinyl compound is subjected to suspension polymerization, wherein a dispersion stabilizer, and where necessary, a dispersion auxiliary are added to water or hot aqueous medium to disperse the vinyl compound, whereafter polymerization is conducted in the presence of an oil-soluble catalyst.

The vinyl compound to be subjected to the suspension polymerization in the present invention may be vinyl chloride monomer, a monomer mixture mainly containing vinyl chloride monomer (vinyl chloride not less than 50 wt %), and the like. A comonomer to be copolymerized with this vinyl chloride monomer may be, for example, vinyl ester such as vinyl acetate and vinyl propionate, (meth)acrylic ester such as methyl (meth)acrylate, ethyl (meth)acrylate and the like, olefin such as ethylene and propylene, maleic anhydride, acrylonitrile, styrene, vinylidene chloride and other monomers copolymerizable with the vinyl chloride monomer.

The present invention is not necessarily limited to polymerization of vinyl chloride monomer. Vinylidene chloride, alkyl vinyl ether, vinyl acetate, (meth)acrylic acid and ester thereof, maleic acid and anhydride thereof, itaconic acid, styrene, acrylonitrile, α-olefin such as isobutylene, isobutene, butadiene and the like, ethylene and the like can be also used. These vinyl compounds can be used alone or as a mixture of one or more kinds therefrom.

The dispersion stabilizer is not particularly limited. For example, cellulose derivatives such as methyl cellulose, hydroxypropylcellulose, hydroxypropylmethylcellulose, carboxymethylcellulose and the like, and water-soluble polymers such as gelatin, polyvinyl alcohol, polyvinyl pyrrolidone and the like can be used of these, polyvinyl alcohol (B) having a degree of hydrolysis of 65–95 mol %, preferably 68–89 mol %, and a polymerization degree of 200–3,500, preferably 500–2,500, is conveniently used.

Examples of polyvinyl alcohol (B) used as a dispersion stabilizer include ethylene, α-olefin, a compound containing anionic groups such as carboxyl, sulfonic acid group and the like, canionic groups such as amino group, ammonium group and the like, cyclic or non-cyclic amido, long chain alkyl, acetoacetyl and the like in a proportion of not more than 10 mol %, polyvinyl alcohol having carbonyl in a molecule or a conjugated double bond, and polyvinyl alcohol modified with diacetoneacrylamide. Two or more members of these dispersion stabilizers may be used in combination.

The amount of the dispersion stabilizer is subject to no particular limitation, but it is preferably 0.01–0.5 part by weight, more preferably 0.05–0.1 part by weight, per 100 parts by weight of the vinyl compound. When it is less than 0.01 part by weight, the stability during suspension polymerization becomes impractically poor, thus resulting in the occurrence of blocking of vinyl chloride and crude particles. When it exceeds 0.5 part by weight, a vinyl chloride resin shows intensive wet foaming in the initial stages of polymerization, or vinyl chloride particles become too fine, or foaming gets intensified during the step for removing monomer after completion of vinyl chloride polymerization.

Where necessary, one or more kinds of known dispersion auxiliaries, such as acrylic acid polymerization product, gelatin, sorbitan ester mixture, polyether mixture and the like, may be added for the stability of polymerization.

As the dispersion auxiliary, polyvinyl ester polymerization product having a degree of hydrolysis of not more than 60 mol % may be added. Examples of the polyvinyl ester polymerization product to be used as a dispersion auxiliary include unmodified polyvinyl ester, polyvinyl ester polymerization product having an ionic group, such as carboxyl, and oxyalkylene group at a side chain or terminus in a proportion of not more than 10 mol %, and the like.

The amount of the dispersion auxiliary is preferably 0.01–0.15 part by weight, more preferably 0.01–0.06 part by weight, particularly preferably 0.01–0.04 part by weight, per 100 parts by weight of the vinyl compound.

The weight ratio of the dispersion stabilizer and the dispersion auxiliary is preferably 90/10–30/70, particularly 80/20–50/50. When the ratio is smaller than 30/70, the stability of polymerization tends to be adversely affected and the particles of polymer tend to get coarse, lowering the packing efficiency. When it is larger than 90/10, the polymer particles have an inconsistent porosity distribution, thus making removal of monomer difficult and packing efficiency low, with possible increase in the number of fish eyes.

The dispersion stabilizer and dispersion auxiliary may be charged at once in the initial stages of the polymerization or added by portions during the polymerization.

The catalyst used for the suspension polymerization is subject to no particular limitation as long as it is an oil-soluble catalyst and may be, for example, a percarbonate compound such as diisopropyl peroxydicarbonate, di-2-ethylhexyl peroxydicarbonate, diethoxyethyl peroxydicarbonate and the like, a perester compound such as t-butyl peroxyneodecanate, α-cumyl peroxyneodecanate, γ-cumyl peroxyneodecanate and the like, a peroxide such as benzoyl peroxide, lauroyl peroxide, acetylcyclohexylsulfonyl peroxide, 2,4,4-trimethylpentyl-2-peroxyphenoxyacetate and the like, an azo compound such as α,α'-azobisisobutyronitrile, α,α'-azobis-2,4-dimethylvaleronitrile, azobis(4-methoxy-2,4-dimethylvaleronitrile) and the like, further, potassium persulfate, ammonium persulfate, hydrogen peroxide and the like, which may be used alone or in combination.

In addition, a water soluble polymerization inhibitor, such as ammonium thiocyanate, nitrite and the like, may be used in a suitable amount for preventing scaling. Further, a known scaling inhibitor, such as "NOXOL WSW", "NOXOL ETH" (manufactured by CIRS) and the like, may be applied to the inner wall of the reaction vessel.

The polymerization temperature is optionally selected from the range known to those of ordinary skill in the art according to the polymerization degree of the objective vinyl resin.

Other additives, such as polymerization degree adjusting agent, processability improving agent, antistatic, pH adjusting agent, antioxidant, scale preventive, chain transfer agent, gel preventive and the like may be used alone or in combination.

In the suspension polymerization performed in the present invention, the ratio of each component, the order of charging thereof, polymerization temperature and the like are subject to no particular limitation, and are suitably determined according to the conditions employed for conventional suspension polymerization of vinyl compounds such as vinyl chloride and the like. In addition, the vinyl compound may be preferably heated before being charged into a polymerization tank.

For an improved production efficiently, an aqueous medium heated to a temperature of not less than 40° C. (preferably not less than 70° C.) may be preferably charged into a polymerization tank before initiation of the polymerization.

In the present invention, a polymerization tank equipped with a reflux condenser is used and a vinyl compound is subjected to suspension polymerization in the presence of a dispersion stabilizer for suspension polymerization, as mentioned earlier. At the time point when the polymerization conversion of the vinyl compound reaches not less than 30% (based on weight), preferably 30–90%, the polyvinyl alcohol resin (A) is added.

The polyvinyl alcohol resin (A) has a degree of hydrolysis of not less than 65 mol %, preferably 65–85 mol %, more preferably 68–83 mol %, particularly preferably 76–82 mol %. When the degree of hydrolysis is less than 65 mol %, dry foams cannot be suppressed but are allowed to appear. When it exceeds 85 mol %, a vinyl resin, vinyl chloride resin among others, has a bulk density above the desired value.

The polyvinyl alcohol resin (A) has a polymerization degree of not less than 700, preferably 700–3,000, more preferably 1,000–2,600, particularly preferably 1,500–2,500. When the polymerization degree is less than 700, a suppressive effect against dry foams cannot be achieved, allowing intensive wet foaming. When it exceeds 3,000, a vinyl resin among others, vinyl chloride resin, has a bulk density above the desired value. This is particularly unpreferable for the production of a soft vinyl chloride resin.

When the polyvinyl alcohol resin (A) has a modified group, the degree of hydrolysis does not concern the modified group but is determined based on a vinyl ester moiety (ester group) and a vinyl alcohol moiety (hydroxyl group) alone.

The polymerization degree of the polyvinyl alcohol resin is measured according to JIS K 6726 after complete hydrolysis of polyvinyl alcohol.

The polyvinyl alcohol resin (A) satisfies the above-mentioned degree of hydrolysis, polymerization degree and the following formula (1), more preferably the following formula (2), particularly preferably the following formula (3).

$$0.0300 \leq (3-Y)/X \leq 0.0330 \quad (1)$$

wherein X is a degree of hydrolysis (mol %) and Y is a degree of iodine absorption.

$$0.0300 \leq (3-Y)/X \leq 0.0320 \quad (2)$$

wherein X and Y are as defined above.

$$0.0310 \leq (3-Y)/X \leq 0.0320 \quad (3)$$

wherein X and Y are as defined above.

A polyvinyl alcohol resin having "(3−Y)/X" in the above-mentioned formula (1) of less than 0.0300 makes an industrial production unfeasible. When it exceeds 0.0300 or 0.0330, the polyvinyl alcohol resin (A) shows slow adsorption rate onto vinyl chloride resin particles, a smaller amount of adsorption, an insufficient dry foaming suppressive effect and an insufficient duration of the effect, thus failing to exert the effect of the present invention.

The degree of iodine absorption is expressed by the absorbance measured at wavelength 490 nm, slit width 1 mm for a mixture of a 0.1 wt % sample solution (5 ml), pure water (11 ml) and 1/1000[N] iodine solution (4 ml), which mixture has been adjusted to 25° C. and stood for 20 min.

The polyvinyl alcohol resin (A) satisfying the above-mentioned formula (1) can be produced by controlling the dielectric constant of the hydrolysis solvent used for the production method of a polyvinyl alcohol resin to be mentioned later, wherein polyvinyl-acetate obtained by polymerization of vinyl ester, particularly vinyl acetate, is subjected to ester exchange in the presence of an alkali to effect hydrolysis.

Such polyvinyl alcohol resin (A) can be also produced by hydrolysis of a polyvinyl ester polymerization product using a hydrolysis catalyst, such as NaOH, KOH, Ca(OH)$_2$ and the like.

The vinyl ester is subject to no particular limitation and may be vinyl formate, vinyl acetate, vinyl propionate, vinyl caprylate, vinyl laurate, vinyl barsatate, vinyl palmitate, vinyl pivalate, vinyl stearate and the like, with particular preference given to vinyl acetate from the practical point of view.

It is also possible to copolymerize vinyl ester with a monomer copolymerizable therewith in an amount of not more than 10 mol %, preferably not more than 5 mol %.

Examples of the copolymerizable monomer include olefin (e.g., ethylene, propylene, α-butene, α-octene, α-dodecene, α-octadecene and the like), unsaturated monocarboxylic acid (e.g., acrylic acid, methacrylic acid, crotonic acid and the like) or ester or salt thereof, unsaturated polyvalent carboxylic acid (e.g., maleic acid, fumaric acid, itaconic acid and the like) or partial or complete ester or salt or anhydride thereof, unsaturated sulfonic acid (e.g., ethylenesulfonic acid, allylsulfonic acid, methallylsulfonic acid, sulfoalkyl malate, sulfoalkyl(meth)acrylamide, sulfoalkyl(meth) acrylate, acrylamide-2-methylpropanesulfonic acid and the like) or salt thereof, amide (e.g., acrylamide, methacrylamide and the like), nitrile (e.g., acrylonitrile, (meth) acrylonitrile and the like), vinyl ether, vinyl ketone, vinyl chloride, diacetoneacrylamide and the like.

Alternatively, an oxyethylene group may be introduced into a vinyl ester polymerization product by the use of a copolymerizable monomer, such as polyoxyethylene(meth) acrylate, polyoxypropylene(meth)acrylate, polyoxyethylene (meth)acrylic amide, polyoxypropylene(meth)acrylic amide, polyoxyethylene (1-(meth)acrylamide-1,1-dimethylpropyl) ester, polyoxyethylene (meth)allyl ether, polyoxypropylene (meth)allyl ether, olyoxyethylene vinyl ether, polyoxypropylene vinyl ether and the like. Alternatively, thioacetic acid may be used as a chain transfer agent to introduce thiol into the terminal of polyvinyl alcohol resin (A) during polymerization of vinyl ester. It is also possible to use a known chain transfer agent such as various alkylmercaptanes to introduce terminal alkyl into a vinyl ester polymerization product.

In the hydrolysis step of the vinyl ester polymerization product, a residual monomer may be removed as necessary before hydrolysis according to a conventional method. To be specific, a vinyl ester polymerization product is dissolved in a solvent, or a given amount of a solvent is added to a vinyl ester polymerization product, the acid component in the resin is neutralized as necessary, whereafter or concurrently with neutralization, hydrolysis is conducted using an alkali catalyst.

While the solvent to be used for hydrolysis is subject to no particular limitation, a solvent having a dielectric constant of not more than 32 c.g.s.e.s.u. (wherein "c.g.s.e.s.u." are electrostatic units in the cgs system) is preferably used in the present invention. More preferable dielectric constant is 6–29 c.g.s.e.s.u., which is particularly preferably 12–28 c.g.s.e.s.u. When the dielectric constant exceeds 32 c.g.s.e.s.u., the block like distribution of residual acetyl group in polyvinyl alcohol resin (A) is degraded and the adsorption rate of plasticizer by vinyl resin (particularly vinyl chloride resin) particles decreases, which in turn unpreferably causes an insufficient dry foaming suppressive effect.

Examples of the solvent having a dielectric constant of not more than 32 c.g.s.e.s.u. include methanol (31.2 c.g.s.e.s.u.), a mixed solvent (27.1 c.g.s.e.s.u.) of methyl acetate/methanol=1/3 (weight ratio), a mixed solvent (21.0 c.g.s.e.s.u.) of methyl acetate/methanol=1/1 (weight ratio), a mixed solvent (13.9 c.g.s.e.s.u.) of methyl acetate/methanol=3/1 (weight ratio), methyl acetate (7.03 c.g.s.e.s.u.), isopropyl acetate (6.3 c.g.s.e.s.u.), trichloroethylene (3.42 c.g.s.e.s.u.), xylene (2.37 c.g.s.e.s.u.), toluene (2.38 c.g.s.e.s.u.), benzene (2.28 c.g.s.e.s.u.), acetone (21.4 c.g.s.e.s.u.) and the like.

The concentration of the vinyl ester polymerization product in a solvent is appropriately determined according to the viscosity of the system. It is generally within the range of 10–60 wt %.

The catalyst to be used for hydrolysis may be, for example, an alkali catalyst such as hydroxide of alkali metal (e.g., sodium hydroxide, potassium hydroxide and the like) or alcoholate (e.g., sodium methylate, sodium ethylate, potassium methylate and the like).

The catalyst is used in an amount appropriately determined according to a hydrolysis method, a desired degree of hydrolysis and the like. It is generally 0.1–10 mol % of vinyl ester.

The hydrolysis reaction temperature is subject to no particular limitation and is generally selected from the range of 10–60° C., preferably 20–50° C. After the completion of the hydrolysis reaction, the reaction product is neutralized as necessary, washed with alcohol and the like and dried.

The above-mentioned polyvinyl alcohol resin (A) may be converted to acetal, urethane, phosphoric ester or cyanoethyl, or grafted with vinyl monomer, as long as the effect of the present invention is not impaired.

In this way, polyvinyl alcohol resin (A) to be used in the present invention, which satisfies the above-mentioned formula (1) and which has a degree of hydrolysis of not less than 65 mol %, preferably 65–85 mol %, and a polymerization degree of not less than 700, preferably 700–3,000, can be obtained.

With regard to suspension polymerization of a vinyl compound, polyvinyl alcohol resin (A) is added at a time point when polymerization conversion of the vinyl compound reaches not less than 30%, preferably 30–90%, more preferably 40–85%, particularly preferably 50–80%. Addition at a point where the polymerization conversion is less than 30% results in lower plasticizer absorption property of particularly vinyl chloride resin and lower decreasing rate of fish eyes. In the polymerization of vinyl monomer, particularly vinyl chloride monomer, a polymerization conversion over 90% is industrially difficult to achieve.

When dry foams are generated immediately before lowering of the internal pressure of the polymerization tank or immediately after lowering of the internal pressure of the polymerization tank, polyvinyl alcohol resin (A) is preferably added at this point.

The polyvinyl alcohol resin (A) can be added at once or continuously added or discontinuously added in two or more portions. The portionwise addition is preferable because the dry foam suppressive effect is maintained over an extended period of time. For example, the entire amount of the polyvinyl alcohol resin (A) to be added is continuously added over a given time period while the polymerization conversion of the vinyl compound is not less than 30% (preferably 30–90%, more preferably 40–85%, still more preferably 50–80%), or added discontinuously in two or more portions at certain time intervals.

The mode of addition of polyvinyl alcohol resin (A) is subject to no particular limitation. For example, it is added in the form of an aqueous solution, an aqueous dispersion, a solution of organic solvent (e.g., methanol), a mixed solution of methanol and water, and the like.

The solution of polyvinyl alcohol resin (A) has, at the time of addition, a concentration of generally 0.01–30 wt % and a temperature free of any particular limitation. The temperature may be room temperature to polymerization temperature of the vinyl compound.

The amount of polyvinyl alcohol resin (A) to be added is 0.001–0.5 part by weight, preferably 0.01–0.1 part by weight, more preferably 0.01–0.05 part by weight, per 100 parts by weight of the vinyl compound subjected to suspension polymerization. When it is less than 0.001 part by weight, the dry foam suppressive effect cannot be exerted, but when it exceeds 0.5 part by weight, vinyl resin, particularly vinyl chloride resin, may have an excessively high bulk density, or gelation of vinyl chloride may be degraded, or foaming during removal of monomer after polymerization of vinyl chloride may be intensified, or vinyl chloride resin may have lower productivity.

According to the production method of vinyl resin of the present invention, a vinyl compound is subjected to suspension polymerization in the presence of a dispersion stabilizer, using a polymerization tank equipped with a reflux condenser. During the suspension polymerization, the above-mentioned polyvinyl alcohol resin (A) is added at a point where the vinyl compound shows polymerization conversion of not less than 30%, whereby a vinyl resin having superior antifoaming property to suppress occurrence of dry foams and a high bulk density is obtained.

The present invention is explained in detail by referring to illustrative examples. In the Examples, "parts" and "%" are based on weight unless otherwise specified.

PRODUCTION EXAMPLE

Production of Polyvinyl Alcohol Resin (A)
Polyvinyl Alcohol Resin (A-1)

Vinyl acetate (100 parts), methanol (16.4 parts) and azobisisobutyronitrile (0.008 mol %, mol % relative to vinyl acetate, hereinafter the same) were fed into a polymerization vessel equipped with a reflux condenser, a titration funnel and a stirrer. Polymerization (polymerization conversion 74%) was conducted for 5.8 hours while refluxing the mixture under a nitrogen stream. Unreacted vinyl acetate was removed from the system to give a methanol solution (resin content 41%) of the polymerization product. This solution was diluted with methyl acetate (dielectric constant 7.03 c.g.s.e.s.u.) to a concentration of 29.5% [dielectric constant of hydrolysis solvent 23.7 c.g.s.e.s.u.] and fed into a kneader. Sodium hydroxide was added for neutralization while maintaining the temperature of the solution at 35° C.

Sodium hydroxide (5 mmol per vinyl acetate unit in the polymer) was added thereto to conduct hydrolysis. The precipitate was collected by filtration, washed thoroughly with methanol and dried in a hot air dryer to give polyvinyl alcohol resin (A-1).

The obtained polyvinyl alcohol resin (A-1) had a degree of hydrolysis of 78.5 mol %, a polymerization degree of 2200, and a degree of iodine absorption of 0.49. The "(3−Y)/X" was 0.0320, which satisfied the formula (1).

Polyvinyl Alcohol Resin (A-2)

Vinyl acetate (100 parts), methanol (11.9 parts) and azobisisobutyronitrile (0.00432 mol %) were fed into a polymerization vessel equipped with a reflux condenser, a titration funnel and a stirrer. Polymerization (polymerization conversion 68%) was conducted for 6.5 hours while refluxing the mixture under a nitrogen stream. Unreacted vinyl acetate was removed from the system to give a methanol solution (resin content 41%) of the polymerization product. This solution was diluted with methyl acetate (dielectric constant 7.03 c.g.s.e.s.u.) to a concentration of 24.9% (dielectric constant of hydrolysis solvent 21.55 c.g.s.e.s.u.) and fed into a kneader. Sodium hydroxide was added for neutralization while maintaining the temperature of the solution at 35° C. Sodium hydroxide (5 mmol per vinyl acetate unit in the polymer) was added thereto to conduct hydrolysis. The precipitate was collected by filtration, washed thoroughly with methanol and dried in a hot air dryer to give polyvinyl alcohol resin (A-2).

The obtained polyvinyl alcohol resin (A-2) had a degree of hydrolysis of 78.6 mol %, a polymerization degree of 2400, and a degree of iodine absorption of 0.56. The "(3−Y)/X" was 0.031, which satisfied the formula (1).

Polyvinyl Alcohol Resin (A-3)

Vinyl acetate (100 parts), methanol (11.9 parts) and azobisisobutyronitrile (0.00432 mol %) were fed into a polymerization vessel equipped with a reflux condenser, a titration funnel and a stirrer. Polymerization (polymerization conversion 68%) was conducted for 6.5 hours while refluxing the mixture under a nitrogen stream. Unreacted vinyl acetate was removed from the system to give a methanol solution (resin content 40%) of the polymerization product. This solution (dielectric constant of hydrolysis solvent 31.2 c.g.s.e.s.u.) was fed into a kneader. Sodium hydroxide was added for neutralization while maintaining the temperature of the solution at 35° C. Sodium hydroxide (5 mmol per vinyl acetate unit in the polymer) was added thereto to conduct hydrolysis. The precipitate was collected by filtration, washed thoroughly with methanol and dried in a hot air dryer to give polyvinyl alcohol resin (A-3).

The obtained polyvinyl alcohol resin (A-3) had a degree of hydrolysis of 78.9 mol %, a polymerization degree of 2400, and a degree of iodine absorption of 0.40. The "(3−Y)/X" was 0.0330, which satisfied the formula (1).

Polyvinyl Alcohol Resin (A-4)

Vinyl acetate (100 parts), methanol (4.9 parts), acetoaldehyde (1.32% of vinyl acetate) and acetylperoxide (0.036 mol % of vinyl acetate) were fed into a polymerization vessel equipped with a reflux condenser, a titration funnel and a stirrer. Polymerization (polymerization conversion 80%) was conducted for 8 hours while refluxing the mixture under a nitrogen stream. Unreacted vinyl acetate monomer was removed from the system to give a methanol solution of the polymerization product. This solution was diluted with methyl acetate (dielectric constant 7.03 c.g.s.e.s.u.) to a concentration of 40% [dielectric constant of hydrolysis solvent (methanol/methyl acetate=1.9/1) 22.8 c.g.s.e.s.u.] and fed into a kneader. Sodium hydroxide was added for neutralization while maintaining the temperature of the solution at 35° C. Sodium hydroxide (5 mmol per vinyl acetate unit in the polymer) was added thereto to conduct hydrolysis. The precipitate was collected by filtration, washed thoroughly with methanol and dried in a hot air dryer to give polyvinyl alcohol resin (A-4).

The obtained polyvinyl alcohol resin (A-4) had a degree of hydrolysis of 72 mol %, a polymerization degree of 850, and a degree of iodine absorption of 0.75. The "(3−Y)/X" was 0.0312, which satisfied the formula (1).

Polyvinyl Alcohol Resin (a-1)

Vinyl acetate (100 parts), methanol (16.4 parts) and azobisisobutyronitrile (0.008 mol %) were fed into a polymerization vessel equipped with a reflux condenser, titration funnel and a stirrer. Polymerization (polymerization conversion 74%) was conducted for 5.8 hours while refluxing the mixture under a nitrogen stream. Unreacted vinyl acetate was removed from the system to give a methanol solution (resin content 32%) of the polymerization product. A small amount of water was added to this solution to adjust the dielectric constant of the hydrolysis solvent 32.2 c.g.s.e.s.u. and the mixture was fed into a kneader. Sodium hydroxide was added for neutralization while maintaining the temperature of the solution at 35° C. Sodium hydroxide (7 mmol per vinyl acetate unit in the polymer) was added thereto to conduct hydrolysis. The precipitate was collected by filtration, washed thoroughly with methanol and dried in a hot air dryer to give polyvinyl alcohol resin (a-1).

The obtained polyvinyl alcohol resin (a-1) had a degree of hydrolysis of 80 mol %, a polymerization degree of 2200, and a degree of iodine absorption of 0.32. The "(3−Y)/X" was 0.0335, which failed to satisfy the formula (1).

Polyvinyl Alcohol Resin (a-2)

Vinyl acetate (100 parts), methanol (16.4 parts) and azobisisobutyronitrile (0.00432 mol %) were fed into a polymerization vessel equipped with a reflux condenser, a titration funnel and a stirrer. Polymerization (polymerization conversion 68%) was conducted for 6.5 hours while refluxing the mixture under a nitrogen stream. Unreacted vinyl acetate was removed from the system to give a methanol solution of the polymerization product. This solution was diluted with benzene (dielectric constant 2.28 c.g.s.e.s.u.) to adjust the concentration of the solution to 30% (dielectric constant of the hydrolysis solvent 16.7 c.g.s.e.s.u.) and fed into a kneader. Sodium hydroxide was added for neutralization while maintaining the temperature of the solution at 35° C. Sodium hydroxide (7 mmol per vinyl acetate unit in the polymer) was added thereto to conduct hydrolysis. The precipitate was collected by filtration, washed thoroughly with methanol and dried in a hot air dryer to give polyvinyl alcohol resin (a-2).

The obtained polyvinyl alcohol resin (a-2) had a degree of hydrolysis of 80 mol %, a polymerization degree of 2200, and a degree of iodine absorption of 0.76. The "(3−Y)/X" was 0.0280, which failed to satisfy the formula (1).

Polyvinyl Alcohol Resin (a-3)

Vinyl acetate (100 parts), methanol (23.9 parts) and azobisisobutyronitrile (0.0136 mol %) were fed into a polymerization vessel equipped with a reflux condenser, a titration funnel and a stirrer. Polymerization (polymerization conversion 80%) was conducted for 5.8 hours while refluxing the mixture under a nitrogen stream. Unreacted vinyl acetate was removed from the system to give a methanol solution (resin content 30%) of the polymerization product. This solution (dielectric constant of the hydrolysis solvent 31.2 c.g.s.e.s.u.) was fed into a kneader. Sodium hydroxide was added for neutralization while maintaining the temperature of the solution at 35° C. Sodium hydroxide (4.5 mmol per vinyl acetate unit in the polymer) was added thereto to conduct hydrolysis. The precipitate was collected by filtration, washed thoroughly with methanol and dried in a hot air dryer to give polyvinyl alcohol resin (a-3).

The obtained polyvinyl alcohol resin (a-3) had a degree of hydrolysis of 60 mol % and a polymerization degree of 1700.

The degree of iodine absorption of polyvinyl alcohol resin (a-3) could not be measured, because the polyvinyl alcohol resin having a degree of hydrolysis of 60 mol % is insoluble in water.

Polyvinyl Alcohol Resin (a-4)

Vinyl acetate (100 parts), methanol (58 parts) and azobisisobutyronitrile (0.066 mol %) were fed into a polymerization vessel equipped with a reflux condenser, a titration funnel and a stirrer. Polymerization (polymerization conversion 75%) was conducted for 4.7 hours while refluxing the mixture under a nitrogen stream. Unreacted vinyl acetate was removed from the system to give a methanol solution (resin content 41%) of the polymerization product. This solution was diluted with methyl acetate (dielectric constant 7.03 c.g.s.e.s.u.) to adjust the concentration of the solution to 24.9% (dielectric constant of the hydrolysis solvent 21.55 c.g.s.e.s.u.) and fed into a kneader. Sodium hydroxide was added for neutralization while maintaining the temperature of the solution at 35° C. Sodium hydroxide (5 mmol per vinyl acetate unit in the polymer) was added thereto to conduct hydrolysis. The precipitate was collected by filtration, washed thoroughly with methanol and dried in a hot air dryer to give polyvinyl alcohol resin (a-5).

The obtained polyvinyl alcohol resin (a-5) had a degree of hydrolysis of 80 mol %, a polymerization degree of 500, and a degree of iodine absorption of 0.52. The "(3−Y)/X" was 0.0310, which satisfied the formula (1).

The above-mentioned (A-1) to (A-4) and (a-1) to (a-4) are shown in Table 1.

TABLE 1

| | Degree of hydrolysis (mol %) | Polymerization degree | Degree of iodine absorption | (3-Y)/X |
|---|---|---|---|---|
| (A-1) | 78.5 | 2200 | 0.49 | 0.0320 |
| (A-2) | 78.6 | 2400 | 0.56 | 0.0310 |
| (A-3) | 78.9 | 2400 | 0.40 | 0.0330 |
| (A-4) | 72 | 850 | 0.75 | 0.0312 |
| (a-1) | 80 | 2200 | 0.32 | 0.0335 |
| (a-2) | 80 | 2200 | 0.76 | 0.0280 |
| (a-3) | 60 | 1700 | — | — |
| (a-4) | 80 | 500 | 0.52 | 0.0310 |

EXAMPLES 1–4 AND COMPARATIVE EXAMPLES 1–5

Polyvinyl alcohol (450 g) having a degree of hydrolysis of 79.5 mol % and a polymerization degree of 2400, di-2-ethylhexyl peroxydicarbonate (260 g), deionized water (900 kg) and vinyl chloride (600 kg) were charged in a 2000 L polymerization tank with a reflux condenser. During stirring, hot water was passed through a jacket to raise the temperature to 57° C. to start polymerization. The pressure within the polymerization tank at the start of the polymerization was 7.0 kg/cm² G.

The polymerization was continued, and when the specific polymerization conversion as shown in Table 2 was achieved, polyvinyl alcohol resin (A) (or polyvinyl alcohol resin (a)) as shown in Table 2 was added. When the pressure within the polymerization tank decreased to 6.0 kg/cm² G, unreacted monomer was recovered. Polymerization slurry was removed from the vessel, dehydrated and dried to give a vinyl chloride resin.

Occurrence of dry foams in the polymerization tank and the obtained vinyl chloride resin were evaluated as follows.

The evaluation results of the polymerization in Examples and Comparative Examples are shown in Table 2.

Attachment of Scale

Occurrence of dry foams in a polymerization tank was evaluated based on the observation of the attachment of scales to the reflux condenser. The evaluation criteria were as follows.

○ . . . Attachment of scale was not found.

Δ . . . Attachment of small amount of scale was found.

X . . . Attachment of large amount of scale was found.

Amount of Foam-like Polymerization Product

The vinyl chloride resin (10 kg) was passed through a sieve of 48-mesh according to JIS Z-8801, and the resin remaining on the sieve was measured, which measure was used for calculation of the proportion relative to the initial amount (10 kg).

Bulk Density of Vinyl Chloride Resin

Measured according to JIS K-6721.

TABLE 2

| | Polyvinyl alcohol resin (A) | Amount added (part) | Polymerization conversion (%) upon addition | Method of addition | Attachment of scale | Amount of foam-like polymerization product (%) | Bulk density (g/cc) |
|---|---|---|---|---|---|---|---|
| Ex. 1 | A-1 | 0.03 | 70–80 | continuous | ○ | 0.01 | 0.53 |
| Ex. 2 | A-2 | 0.04 | 70–80 | continuous | ○ | 0.03 | 0.51 |
| Ex. 3 | A-3 | 0.04 | 50, 60, 70 | spot | ○ | 0.04 | 0.50 |
| Ex. 4 | A-4 | 0.04 | 70–80 | continuous | Δ | 0.04 | 0.48 |
| Com. Ex. 1 | a-1 | 0.03 | 70–80 | continuous | X | 0.42 | 0.47 |
| Com. Ex. 2 | a-2 | 0.03 | 70–80 | continuous | X | 0.41 | 0.51 |
| Com. Ex. 3 | a-3 | 0.04 | 50, 60, 70 | spot | X | 0.45 | 0.45 |

TABLE 2-continued

| | Polyvinyl alcohol resin (A) | Amount added (part) | Polymerization conversion (%) upon addition | Method of addition | Attachment of scale | Amount of foam-like polymerization product (%) | Bulk density (g/cc) |
|---|---|---|---|---|---|---|---|
| Com. Ex. 4 | a-4 | 0.03 | 70–80 | continuous | X | 0.30 | 0.45 |
| Com. Ex. 5 | A-1 | 0.30 | 25 | spot | X | 0.40 | 0.49 |

Note: The amount added (part) is based on 100 parts of vinyl chloride.

The production method of a vinyl resin of the present invention comprises addition of a specific polyvinyl alcohol resin (A) at the time point when the polymerization degree of the vinyl compound reaches not less than 30% during suspension polymerization in the presence of a dispersion stabilizer, using a polymerization tank equipped with a reflux condenser. Consequently, the present invention affords a vinyl resin having a high bulk density, which shows a superior antifoaming effect to suppress dry foams generated during the middle and the latter periods of polymerization.

This application is based on a patent application Ser. No. 307000/1999 filed in Japan, the contents of which are hereby incorporated by reference.

What is claimed is:

1. A method of producing a vinyl resin, which comprises
   (i) preparey polyvinyl alcohol resin (A) by hydrolysis in the presence of a solvent with a dielectric constant of 6–29 c.g.s.e.s.u., wherein the polyvinyl alcohol resin (A) has a degree of hydrolysis of not less than 65 mol % and a polymerization degree of not less than 700 and satisfying the following formula (1)

$$0.0300 \leq (3-Y)/X \leq 0.0330 \quad (1)$$

wherein X is a degree of hydrolysis (mol %) and Y is a degree of iodine absorption;

(ii) subjecting a vinyl compound to suspension polymerization in a polymerization tank equipped with a reflux condenser in the presence of a dispersion stabilizer; and
   (iii) adding the polyvinyl alcohol resin (A) to the polymerization tank at a point where polymerization conversion of the vinyl compound is not less than 30%.

2. The method of claim 1, wherein the polyvinyl alcohol resin (A) is added in a proportion of 0.001–0.5 parts by weight per 100 parts by weight of the vinyl compound.

3. The method of claim 1, wherein the polyvinyl alcohol resin (A) is added continuously or discontinuously.

4. The method of claim 1, wherein the polyvinyl alcohol resin (A) is added continuously.

5. The method of claim 1, wherein the polyvinyl alcohol resin (A) is added discontinuously.

6. The method of claim 1, wherein the solvent has a dielectric constant of 12–28 c.g.s.e.s.u.

7. The method of claim 6, wherein the polyvinyl alcohol resin (A) is added in a proportion of 0.001–0.5 parts by weight per 100 parts by weight of the vinyl compound.

8. The method of claim 6, wherein the polyvinyl alcohol resin (A) is added continuously.

9. The method of claim 6, wherein the polyvinyl alcohol resin (A) is added discontinuously.

* * * * *

UNITED STATES PATENT AND TRADEMARK OFFICE
CERTIFICATE OF CORRECTION

PATENT NO. : 6,613,853 B1  Page 1 of 1
DATED : September 2, 2003
INVENTOR(S) : Shibutani It is certified that error appears in the above-identified patent and that said Letters Patent is hereby corrected as shown below:

<u>Title page,</u>
Item [57], ABSTRACT,
Line 9, "$0.0300 \leq (3-Y)/X < 0.0330$" should read -- $0.0300 \leq (3-Y)/X \leq 0.0330$ --.

<u>Column 1,</u>
Line 45, "ref lux" should read -- reflux --.

<u>Column 6,</u>
Lines 54-55, "ether,
olyoxyethylene" should read -- ether, polyoxyethylene --.

<u>Column 13,</u>
Line 31, "preparey" should read -- preparing a --.

Signed and Sealed this

Ninth Day of December, 2003

JAMES E. ROGAN
*Director of the United States Patent and Trademark Office*